INVENTORS:
WILLIAM BARTON EDDISON
WARREN E. ERICKSON

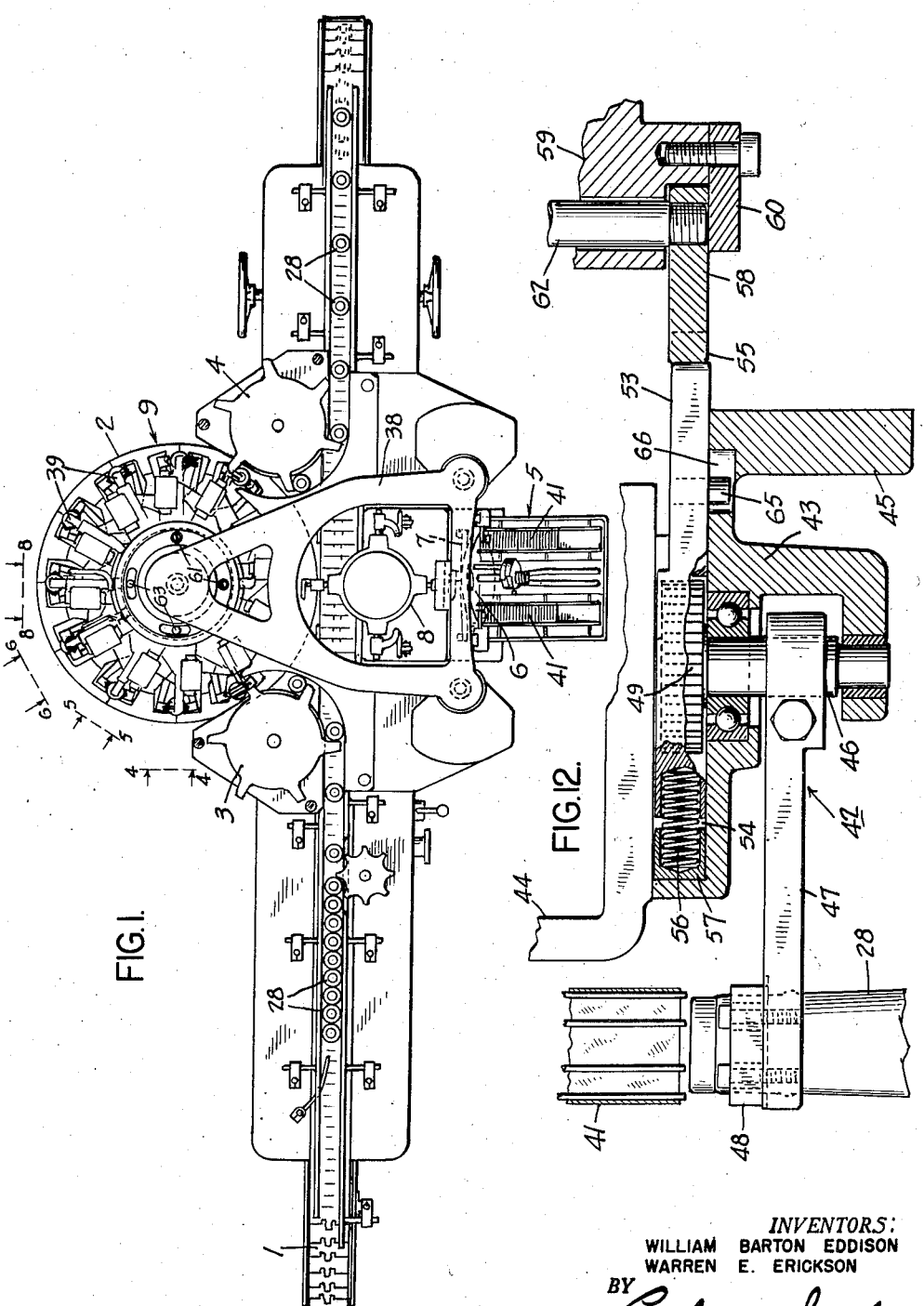

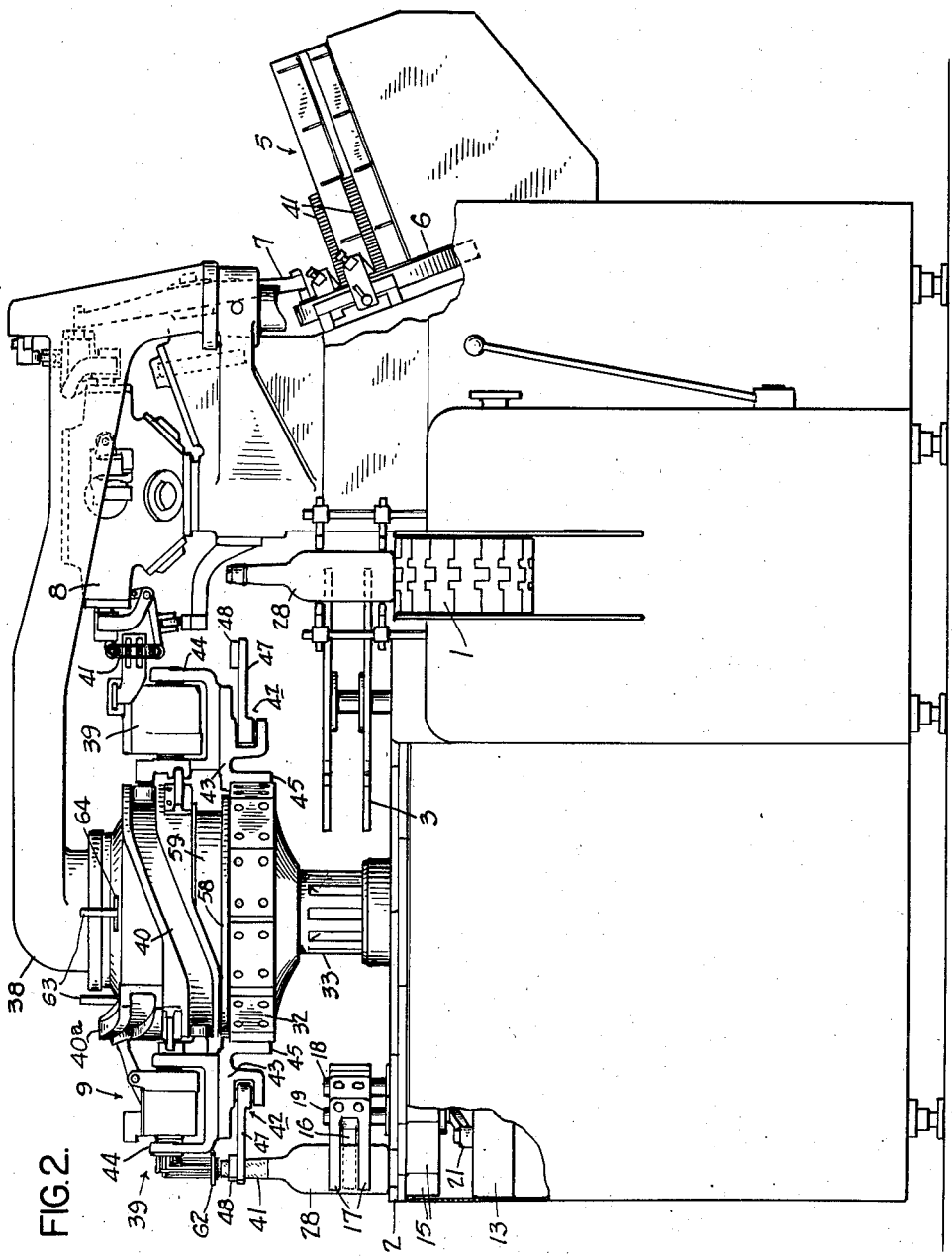

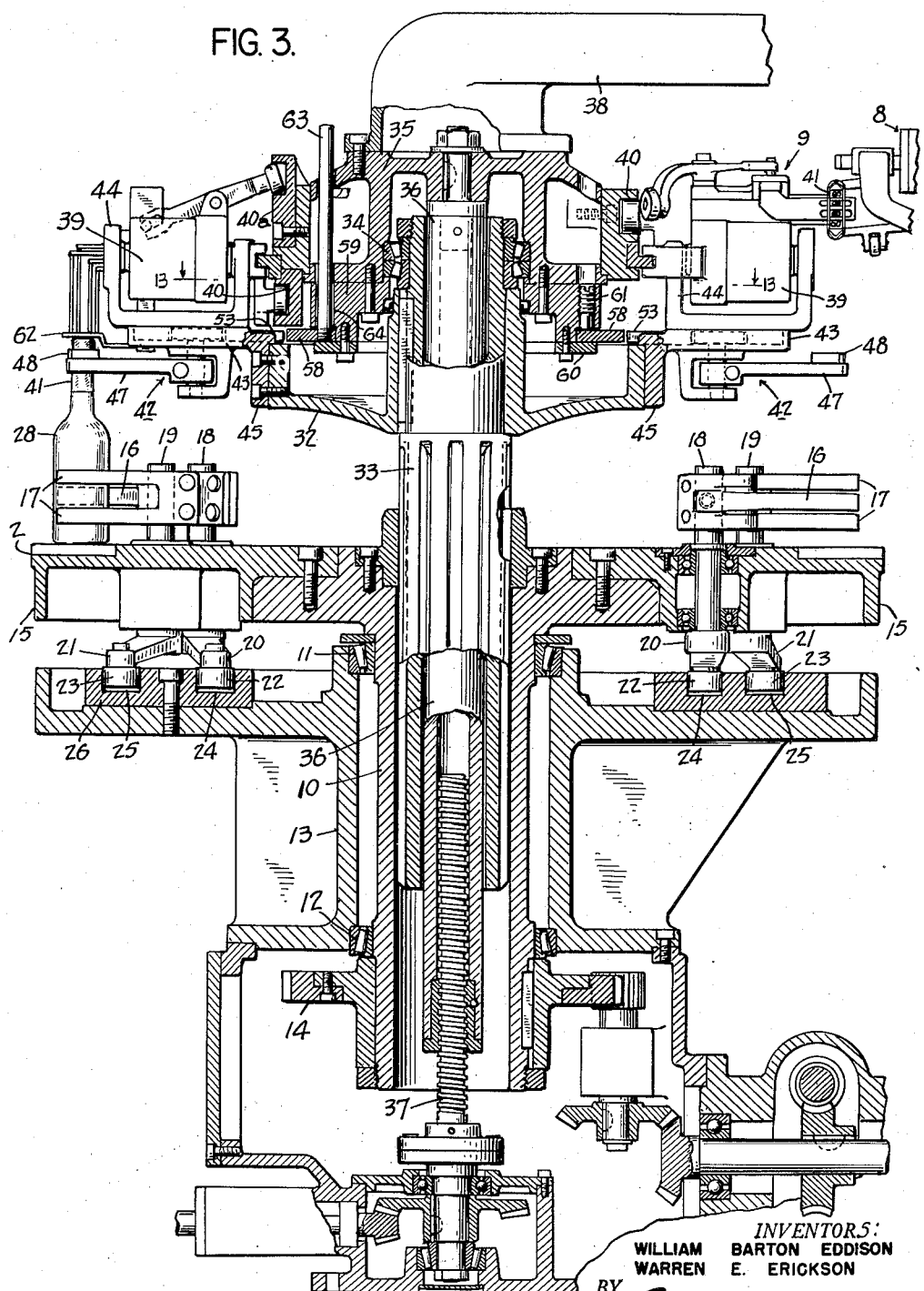

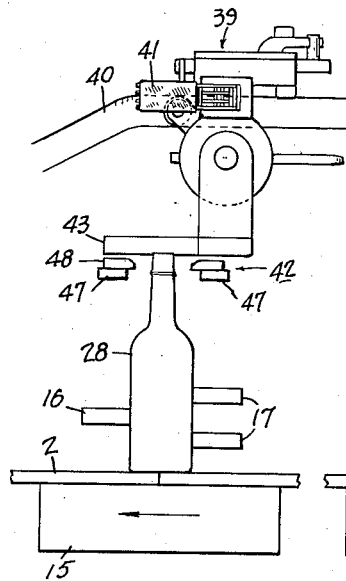
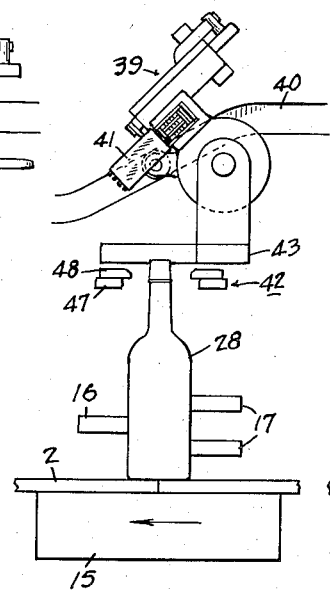
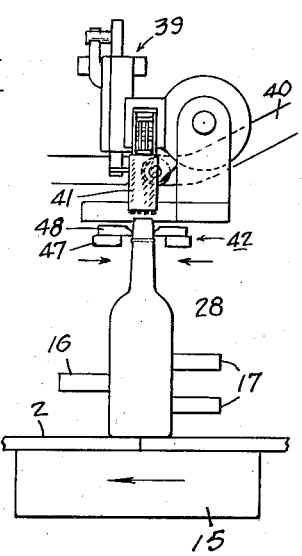
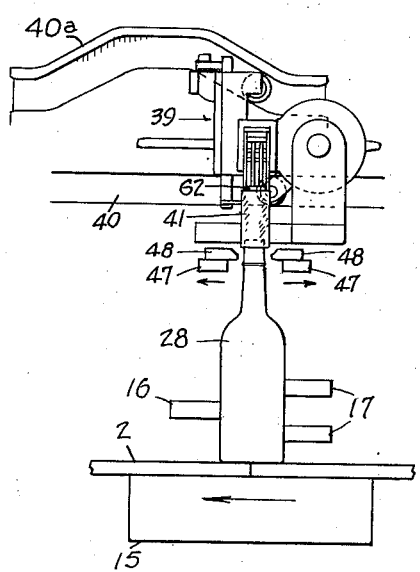
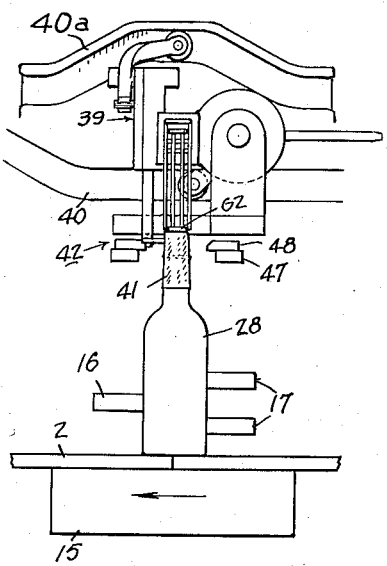

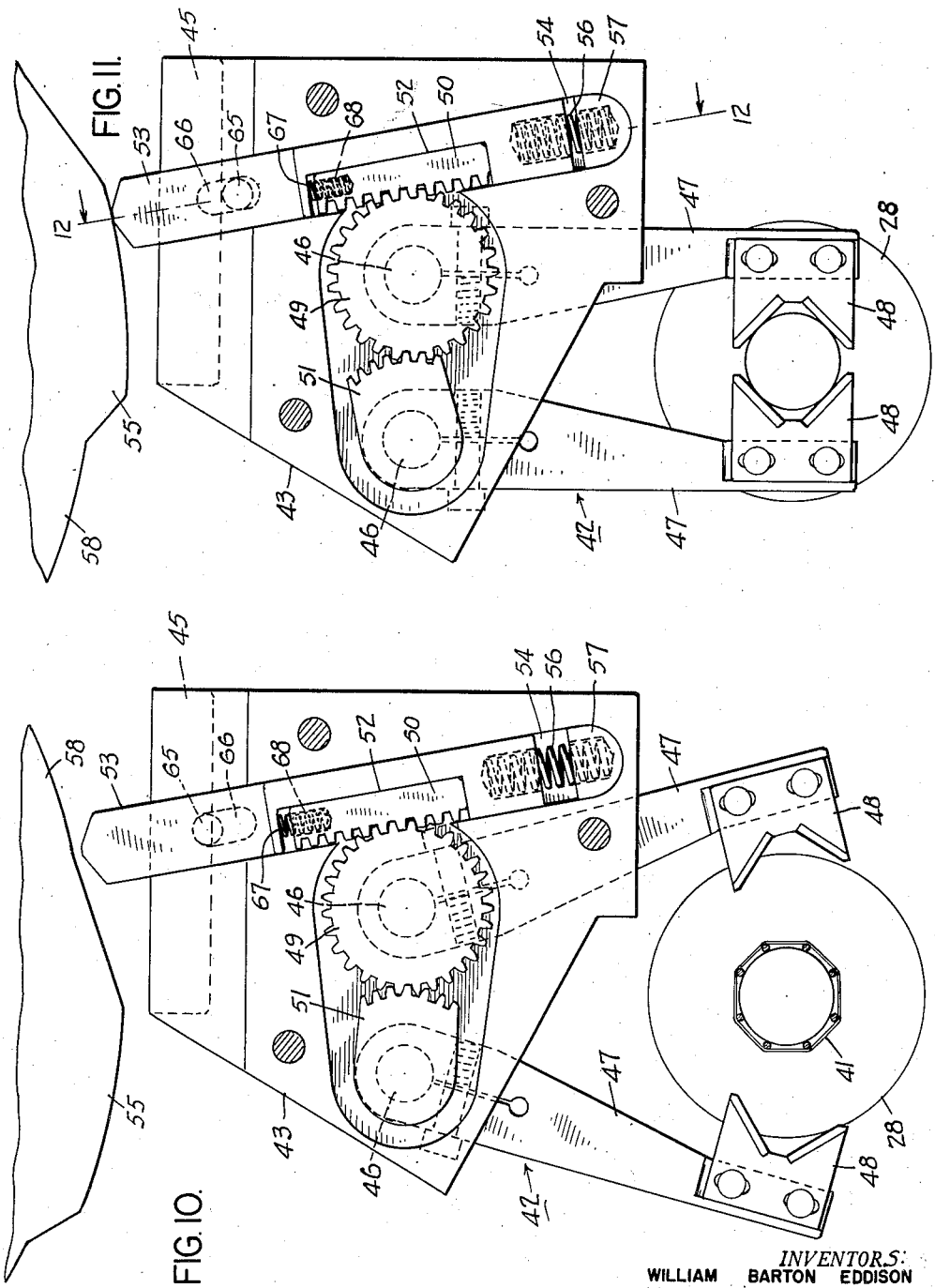

United States Patent Office 2,826,884
Patented Mar. 18, 1958

2,826,884

APPARATUS FOR APPLYING SEALING BANDS TO BOTTLE TOPS AND THE LIKE

William Barton Eddison, Irvington, N. Y., and Warren E. Erickson, Madison, Wis., assignors to Gisholt Machine Company, Madison, Wis., a corporation of Wisconsin Application April 19, 1954, Serial No. 423,975

14 Claims. (Cl. 53—295)

This invention relates to apparatus for applying sealing bands to bottle tops and the like and more particularly to apparatus to provide accurate registry between the seal applied and the bottle top at the instance of the initial telescoping action between the seal band and the top of the bottle.

In bottle capping machines and the like it has been the practice to clamp the body of the bottle in position and to provide a cap which will center itself on the top of the bottle, shifting the cap holder by a sort of cam action of the cap or cap holder where necessary to center the cap thereon. Such a system has not been satisfactory in applying sealing bands over the corked or capped bottle tops since the seals are too weak to cam themselves into position or to shift the bottle tops laterally where a lack of initial accurate registry exists.

It has been found that any attempt to obtain registry by accurately clamping the body or shoulder on the bottle is unavailing due to wide inaccuracies in bottle shapes whereby the bottle tops are frequently substantially off-center relative to the body of the bottle. Where tall long-necked bottles are employed it is also unavailing to clamp the neck of the bottle since the actual upper rim of the bottle top is frequently substantially off-center with respect to the bottle neck.

It has not been considered possible to clamp the bottle in the area that is to be covered by the sealing band. As a consequence larger sealing bands have had to be employed to allow for misalignment between the top of each bottle and the corresponding band as the latter is applied thereover.

The present invention is based upon a system of necking bottles which provides a more accurate alignment between the top end or rim of the neck and the sealing band applier so that misapplication of bands is avoided and in some instances smaller bands may be employed.

The invention provides apparatus to loosely hold the bottle in place and to clamp an index surface on the bottle top generally within the region to be covered by the seal band and which is so coordinated with the seal band applier as to avoid interference with the initial application of the band to the bottle top. The index surface employed is the surface most nearly concentric with the upper lip of the bottle. In whiskey bottles there is usually a short cylindrical index surface just below the lip and which is molded concentric with the lip and may be utilized for accurately indexing the bottles. In other bottles the index surface to be employed should be whatever is available near enough to the lip or rim to provide the desired accuracy of index.

The invention has been applied to a rotary type of machine where the bottles are loosely held in position on a rotating table and seal band applying heads are mounted above the bottles and rotate therewith. In this application of the invention a necking clamp is carried just beneath each corresponding head and is actuated by cam means as the table and heads rotate in unison to apply the seals one by one to successive bottles. The necking clamp is first closed upon the index surface of the bottle and then as the lower end of the seal band starts to telescope down over the lip of the bottle the clamp is quickly withdrawn from the bottle leaving the bottle neck free to receive the band which then guides itself onto the bottle.

The invention is illustrated in the accompanying drawings as embodied in a machine such as that described and claimed in copending application Serial No. 416,184 filed March 15, 1954, by the present inventors, and which constitutes the best mode presently contemplated of carrying out the invention.

In the drawings:

Figure 1 is a top plan view of the bottle sealing machine to which the invention has been applied;

Fig. 2 is a left end elevation of the machine with the casing and drive partially in section and parts of the seal applying mechanism removed;

Fig. 3 is an enlarged detail vertical axial section of the table and seal applying mechanism with parts removed;

Fig. 4 is a front elevation of a sector of the table and seal applying mechanism showing the position at the time of bottle clamping as taken on line 4—4 of Fig. 1;

Fig. 5 is a view similar to Fig. 4 taken after necking of the bottle showing the sector indicated by line 5—5 of Fig. 1;

Fig. 6 is a view similar to Fig. 5 taken of the sector indicated by line 6—6 of Figure 1 just before the seal band starts to telescope the bottle top;

Fig. 7 is a view similar to Fig. 6 just after the seal band starts to telescope the bottle top;

Fig. 8 is a view similar to Fig. 6 taken of the sector indicated by line 8—8 of Fig. 1 and showing the seal band fully applied to the bottle top;

Fig. 10 is a detail view of the necking clamp with parts broken away and sectioned to show the actuating mechanism with the clamp in open position;

Fig. 11 is a view similar to Fig. 10 with the clamp in closed bottle necking position;

Fig. 12 is a vertical section taken on line 12—12 of Fig. 11; and

Figure 9:
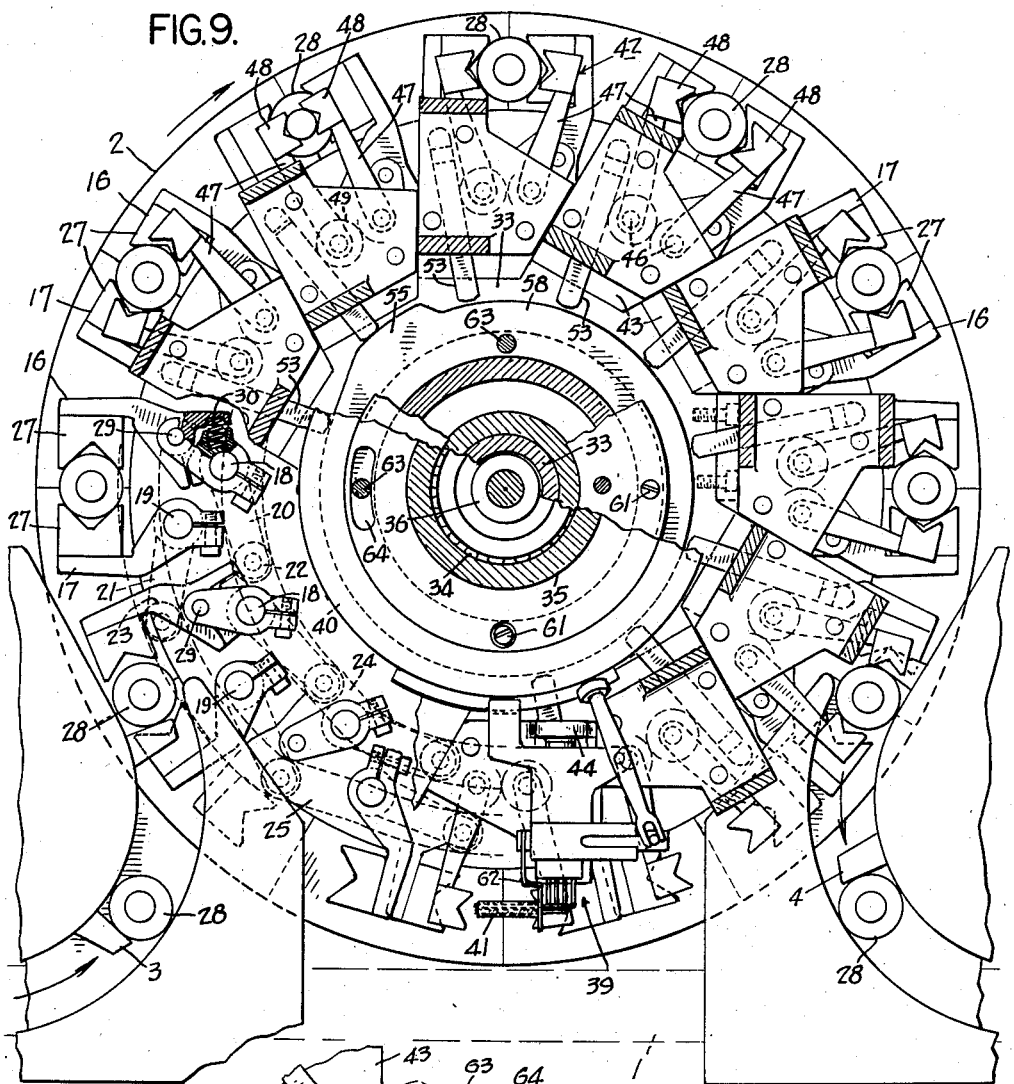
Fig. 9 is an enlarged top plan view of the seal applying mechanism with all but one head broken away.
Figure 13:
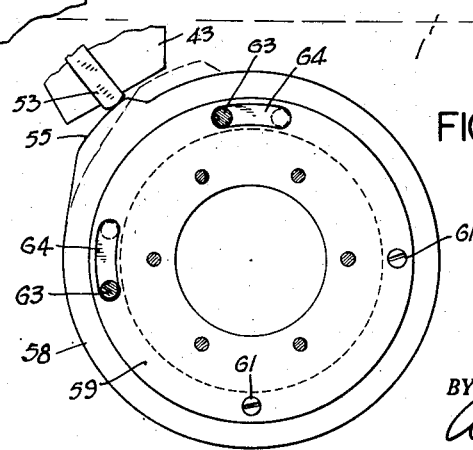
Fig. 13 is a schematic view showing the cam adjustment.

The machine illustrated is described in detail in the copending application referred to above and need not be considered in detail here. For the purpose of the present invention it is sufficient to state that the machine comprises bottle handling apparatus and seal handling apparatus.

The bottle handling apparatus comprises a bottle conveyor 1 extending longitudinally of the machine, a rotary table 2 adjacent the conveyor, an intake pocket wheel 3 which sweeps the bottles from conveyor 1 onto table 2, and an exhaust pocket wheel 4 which sweeps the bottles from table 2 back onto conveyor 1.

The seal handling apparatus comprises a magazine seal supply 5, a stripper mechanism 6 for removing seals successively from the supply, a seal spearing mechanism 7, a seal transfer mechanism 8, and seal applying mechanism 9 rotationally disposed above table 2 and concentric therewith.

The table 2 is mounted on the upper end of a vertical hollow spindle 10 rotationally held in suitable spaced bearings 11 and 12 in a housing 13. A ring gear 14 secured to the lower end of spindle 10 serves to drive the same.

The table 2 comprises a plurality of circumferentially adjacent sectors 15, each carrying a bottle clamp made up of a pair of arms 16 and 17 mounted on corresponding vertical shafts 18 and 19, respectively.

The shafts 18 and 19 are mounted in suitable bearings in the corresponding sector 15 and extend downwardly through the sector to carry corresponding cranks 20 and 21 on their respective lower ends.

The cranks 20 and 21 carry corresponding cam followers 22 and 23, respectively, on their outer ends and which depend therefrom to ride in corresponding cam grooves 24 and 25, respectively, in the top of a circular fixed member 26 carried by housing 13 beneath the table 2.

The cam grooves 24 and 25 are non-circular and extend generally circumferentially of table 2 to effect a pivotal separation of the clamp arms 16 and 17 for a given part of their travel as the table rotates, and a pivotal closing of the clamp arms 16 and 17 together for another part of their travel.

Each pair of clamp arms 16 and 17 have bottle clamping inserts 27 at their outer ends adapted to grip a bottle 28 loosely and to hold it in a predetermined general position on the corresponding sector 15 of the table when the clamp arms are closed together.

One of the clamp arms, arm 16 as shown, is constructed of two parts pivoted or hinged together as by pivot pin 29 constituting a knee joint for the arm. A spring 30 on the outer side of the knee joint bridging the parts tends to bias the outer part inwardly toward the bottle 28, and when no bottle is present a stop 31 functions to limit the inward pivoting of the outer part of the arm.

The spring 30 tends to cushion the clamping of bottles by the clamp arms and thereby prevent injury to any bottle that may exceed normal tolerances in dimensions, and it also provides a certain looseness in the holding of the bottles for adjustment of the bottles to accommodate accurate necking of the same. This desired looseness of holding of the bottles is additionally provided by a loosensess of cam followers 22 and 23 in their corresponding cam grooves 24 and 25 and by the size of inserts 27 which may be changed for different size bottles.

The seal applying mechanism 9 comprises a rotary member 32 carried on the upper end of a hollow spline shaft 33 which fits into the internally splined spindle 10. The member 32 is supported vertically by the combined radial and thrust bearing 34 at the upper end of shaft 33 in a fixed support 35 which is carried by the upper end of a post 36 disposed axially inside shaft 33.

The post 36 is vertically adjustable by means of a screw jack 37 at its lower end, and support 35 is secured against rotation by the upper yoke 38 of the machine frame.

The rotary member 32 carries a plurality of seal applying heads 39 spaced around the circumference thereof and actuated by cams 40 and 40a on the outer surface of support 35 to cause each head to pick up a corresponding seal 41 from the transfer mechanism 8 as the head passes over the no bottle side of table 2, then to turn the seal to a vertical position generally over the top of the bottle 28 and fully open the seal, and finally to push the seal downwardly upon the bottle top.

The rotary member 32 rotates in unison with table 2 so that a head 39 is disposed above each table sector 15 and is adapted to apply a seal 41 to a bottle 28 on the sector for each revolution of the table 2.

In order to provide the desired registry of the open seal with the bottle top the present invention employs a necking device 42 for each seal applying head 39 and bottle 28.

The bottle necking device 42 comprises a bracket 43 which is secured to member 32 and which supports the upstanding yoke 44 that pivotally carries the corresponding head 39. The bracket 43 has a depending flange 45 at its inner end and which is secured to the outer surface of member 32 by suitable screws.

The bracket 43 carries a pair of spaced vertical shafts 46 in suitable bearings and which have corresponding clamping arms 47 secured thereon and extending outwardly therefrom beneath the body of the bracket and the head 39. The outer end of each arm 47 carries a V block 48 which is shaped to cooperate with the opposite block to clamp the finish surface of the neck of the bottle 28.

The pivoting of arms 47 of each pair of arms to close clamp blocks 48 upon the bottle neck and then to separate blocks 48 to release the bottle neck is obtained by a cam actuated rack and pinion mechanism.

For this purpose one of the shafts 46 has a spur gear 49 at its upper end and which meshes with a gear rack 50 for driving the same. The opposite shaft 46 carries a sector gear 51 at its upper end and which meshes with spur gear 49 on the opposite side from rack 50 so that the arms 47 carried by shafts 46 are driven in unison. Gears 49 and 51 have equal radii so that the clamp blocks 48 are always equidistant from the position for the center of the bottle neck.

The rack 50 is disposed in a recess 52 in a push rod 53 extending substantially radially of rotating member 32. The push rod 53 is disposed in a slot 54 in the top of bracket 43 and the inner end of the rod protrudes inwardly of the bracket to engage a cam 55 carried by the support 35.

The push rod 53 is biased inwardly toward the cam 55 by a compression spring 56 of substantial strength and confined in aligned bores in the outer end of the push rod and in a spring seat 57 disposed in the semicircular end of slot 54. The spring 56 is short in stroke and is slightly preloaded. Being a stiff spring it exerts a substantial bias on the push rod 53 when the latter is pushed thereagainst by the cam 55, so that almost instantly upon dropping away of the cam the spring will force the push rod inwardly and separate clamping blocks 48 from the bottle neck.

The cam 55 is an outwardly extending lobe on a circular cam ring 58 clamped in adjusted position at the underside of a cam bracket 59 on fixed support 35 and which bracket carries cams 40 and 40a for actuating the heads 39 as explained in the copending application referred to above. A clamp ring 60 supports the cam ring 58 with its cam lobe 55 in adjusted position relative to bracket 59, and ring 58 is clamped to ring 60 by suitable acrews 61 in bracket 59.

The cam lobe 55 has a long approach and a sharp drop away whereby the clamp blocks 48 are slowly, and positively brought into engagement with the bottle top to center the latter beneath a seal carried by the fingers of the corresponding head 39, and whereby as soon as the seal 41 has started downwardly over the top lip or rim of the bottle as shown in Fig. 7, the spring 56 opens the necking clamp by separating clamp blocks 48 so that the blocks do not interfere with the further downward movement of the seal. Thereafter the seal, having started over the bottle top, guides itself onto the bottle top as the seal is pushed downwardly by pusher member 62 of head 39.

For the purpose of adjusting the position circumferentially of table 2 where the bottle neck must be centered with the seal and where the clamp blocks 48 must be withdrawn to avoid interference with the downwardly moving seal, the cam ring 58 is made adjustable circumferentially of bracket 59 on support 35. In adjusting cam ring 58 the screws 61 are loosened and then the cam ring is rotated by means of two studs 63 threaded downwardly therein at circumferentially spaced positions and extending upwardly through corresponding arcuate slots 64 in the bracket 59 and member 35. This adjustment is necessary for different length seals.

The pusher rod 53 has a stop pin 65 depending therefrom into a slot 66 in bracket 43 which serves to prevent the push rod from riding on the outer surface of cam ring 58 except where the lobe engages the rod.

For the purpose of cushioning the clamp blocks 48 as they close upon a bottle neck, the recess 52 is made longer than rack 50 and the latter is biased normally toward the outer end of the recess by a preloaded compression spring 67 in a bore 68 in the inner end of the rack and which engages the inner end of the recess 52.

The apparatus described is automatic and functions to apply tubular sealing bands to bottle tops and the like without a miss from misalignment. The top rim of the bottle is always aligned with the seal and the latter is always guided home on the bottle top.

In accomplishing this the apparatus first loosely clamps or holds each successive bottle in place on a given segment of a rotary table and as the latter rotates a seal applying head similarly rotates above the sector and by means of cams is actuated to present an open cylindrical tubular seal vertically above the bottle, the bottle neck is then clamped and centered with respect to the open sealing band by blocks 48, and the band is started to move downwardly by pusher 62.

When the lower end of the sealing band telescopes over the top rim of the bottle and before it can engage blocks 48, the latter are quickly withdrawn out of the way and the continued downward pushing of the seal will complete its application to the bottle top without hesitation and without interference by the clamps. The seal guides itself onto the bottle after it has been started on.

The invention utilizes a necking clamp that is applied to the bottle just below the upper rim and in the region which is to be covered by the sealing band. In this way sufficient accuracy is obtained to avoid all difficulty of misalignment in applying the sealing bands to the successive bottle tops.

Various embodiments of the invention may be employed within the scope of the accompanying claims which particularly point out and distinctly claim the subject matter regarded as the invention.

We claim:

1. Apparatus for automatically applying tubular sealing bands to bottle tops and the like, comprising means to loosely position a bottle for the application of a sealing band thereto, means to dispose an open seal vertically above the bottle, means to clamp the neck of the bottle just beneath the upper rim and accurately align the same with the seal, means to move the seal downwardly upon the top of the bottle, and means to withdraw said neck clamping means rapidly from the bottle neck as soon as the lower end of the seal has telescoped the upper rim of the bottle to avoid interference by the clamp means with the downwardly moving seal, said seal serving to guide itself upon the bottle top after withdrawal of said clamping means.

2. The construction of claim 1 in which said bottle positioning means constitutes a rotary table having a plurality of bottle clamps spaced circumferentially thereof on successive sectors of the table, and each said bottle clamp comprises a pair of pivotal clamp arms, separate vertical shafts carrying said arms and extending downwardly through the table, a crank on each shaft, a cam follower carried by the outer end of each crank, and a non-rotary cam member having a groove therein to receive each corresponding follower to actuate the bottle clamp.

3. The construction of claim 1 in which said bottle positioning means constitutes a rotary table having a plurality of bottle clamps spaced circumferentially thereof on successive sections of the table, and each said bottle clamp comprises a pair of pivotal clamp arms, separate vertical shafts carrying said arms and extending downwardly through the table, a crank on the lower end of each shaft, a cam follower depending from the outer end of each crank, and a non-rotary cam member having a groove therein to receive each corresponding follower to actuate the bottle clamp, at least one of said bottle clamp arms being constructed of two parts pivoted to each other and having spring biasing means to cushion the clamping action upon a bottle.

4. The construction of claim 1 in which said bottle positioning means constitutes a rotary table having a plurality of bottle clamps spaced circumferentially thereof on successive sectors of the table, and said seal disposing means comprises a rotary member concentric with said table and above the same to rotate in unison therewith, a seal carrying head for each bottle clamp and carried by said rotary member above the clamp, and fixed cam means to actuate each head to open and position a seal above the bottle as the member and table rotate in unison to provide a sector-like zone where the seal is applied to the corresponding bottle for each successive bottle as it passes through the zone.

5. The construction of claim 1 in which said bottle positioning means constitutes a rotary table having a plurality of bottle clamps spaced circumferentially thereon on successive sectors of the table, said seal disposing means comprises a rotary member concentric with said table and above the same to rotate in unison therewith, a seal carrying head for each bottle clamp and carried by said rotary member above the clamp, and fixed cam means to actuate each head to open and position a seal above the bottle as the member and table rotate in unison to provide a sector-like zone where the seal is applied to the corresponding bottle for each successive bottle as it passes through the zone, and said seal moving means is carried by the head and actuated by an additional fixed cam as the head travels in its circular path by reason of the rotation of said rotary member.

6. The construction of claim 1 in which said bottle positioning means constitutes a rotary table having a plurality of bottle clamps spaced circumferentially thereof on successive sectors of the table, said seal disposing means comprises a rotary member concentric with said table and above the same to rotate in unison therewith, a seal carrying head for each bottle clamp and carried by said rotary member above the clamp, and fixed cam means to actuate each head to open and position a seal above the bottle as the member and table rotate in unison to provide a sector-like zone where the seal is applied to the corresponding bottle for each successive bottle as it passes through the zone, said seal moving means constitutes a pusher carried by the head and actuated by an additional fixed cam as the head travels in its circular path by reason of the rotation of said rotary member, and said bottle neck clamp is carried by said rotary member beneath the head and comprises a pair of pivotal clamping arms, and cam means to actuate said arms in correlation to the application of the seal by said pusher means and in response to the rotation of said rotary member.

7. In apparatus of the class described, a seal carrying head, a bottle necking device carried beneath said head to clamp the bottle just below its top rim and align the same with a seal on the head for application of the seal to a bottle top, and means to actuate said necking device to withdraw the clamping members thereof from the neck of the bottle during downward movement of the seal over the bottle top and just in time to avoid interference with the seal as it moves downward into place.

8. In apparatus of the class described, a bottle necking device comprising a movable member, a bracket secured to said movable member, a pair of spaced vertical shafts mounted in said bracket, a clamp arm carried by each shaft with its outer free end adapted to move toward and away from the outer free end of the other clamp arm to effect a clamping and release of a bottle neck, intermeshing spur gear means on said shafts to provide for pivoting of said clamping arms in unison, a rack in said bracket meshing with said spur gear means to drive the same and secure the clamp arms selectively in closed and open positions, and fixed cam means adjacent the path of said movable member and adapted to engage said rack to actuate the same.

9. In apparatus of the class described, a bottle necking device comprising a rotary member, a bracket secured to said rotary member, a pair of spaced vertical shafts mounted in said bracket, a clamp arm carried by each shaft with its outer free end adapted to move toward and away from the outer free end of the other clamp arm to effect a clamping and release of a bottle neck, intermeshing spur gear means on said shafts to provide for pivoting of said clamping arms in unison, a rack in said bracket meshing with said spur gear means to drive the same and secure the clamp arms selectively in closed and open positions, a push rod carrying said rack and extending radially inward of said bracket, spring means biasing said push rod inwardly in a direction releasing the clamp arms from a bottle neck, and fixed cam means disposed in the path of circular travel of the inner end of said push rod as said rotary member rotates to push said rod outwardly against said spring means and actuate said clamp arms to clamp a bottle neck.

10. The construction of claim 9 and spring means providing a cushioned lost motion between said rack and said push rod to avoid damage to a bottle upon clamping the bottle neck.

11. The construction of claim 9, and means to adjust the position of said cam means circumferentially with respect to the circular path of said necking device.

12. In apparatus for applying tubular seals to bottle tops and the like, comprising means to position an open seal in general alignment with the top for application thereto, means to clamp the top just below the rim thereof to accurately align the same with the seal, means to move the seal axially onto the top, and means to rapidly withdraw said clamp means from the top immediately following initial telescoping of the seal onto the rim of the top to provide for further telescoping movement of the seal onto the top and avoid interference between the seal and said clamp means.

13. The construction of claim 7 in which the bottle necking device comprises a bracket, a pair of spaced vertical shafts mounted in said bracket, a clamp arm carried by each shaft with its outer free end adapted to move toward and away from the outer free end of the other clamp arm to effect a clamping and release of a bottle neck at a location directly beneath the seal carried by said head, intermeshing spur gear means on said shafts to provide for pivoting of said clamping arms in unison, a rack carried by said bracket and meshing with said spur gear means to drive the same and secure the clamp arms selectively in closed and open positions, and means adapted to engage said rack to actuate the same.

14. The construction of claim 7 in which the seal carrying head is mounted on a rotary member, and the bottle necking device comprises a bracket secured to said rotary member beneath said head, a pair of vertical shafts mounted in said bracket, a clamp arm carried by each shaft with its outer free end adapted to move toward and away from the outer free end of the other clamp arm to effect a clamping and release of a bottle neck at a location directly beneath a seal carried by said head, intermeshing spur gear means on said shafts to provide for pivoting of said clamping arms in unison, a rack carried by said bracket and meshing with said spur gear means to drive the same and secure the clamp arms selectively in closed and open positions, and fixed cam means adjacent said rotary member and adapted to engage said rack to actuate the same.

References Cited in the file of this patent
UNITED STATES PATENTS

| | | |
|---|---|---|
| 958,033 | Stewart | May 17, 1910 |
| 1,825,975 | Patenge | Oct. 6, 1931 |
| 2,079,326 | Levy et al. | May 4, 1937 |
| 2,111,155 | Rue et al. | Mar. 15, 1938 |
| 2,579,878 | Stone | Dec. 25, 1951 |
| 2,630,260 | Tracy et al. | Mar. 3, 1953 |
| 2,654,520 | Allen et al. | Oct. 6, 1953 |